United States Patent
Yung et al.

(10) Patent No.: US 7,198,230 B2
(45) Date of Patent: *Apr. 3, 2007

(54) METHOD AND SYSTEM FOR MAXIMIZING SATELLITE CONSTELLATION COVERAGE

(75) Inventors: Kar W. Yung, Torrance, CA (US); Donald C. D. Chang, Thousand Oaks, CA (US)

(73) Assignee: The DirecTV Group, Inc., El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1560 days.

(21) Appl. No.: 08/949,988

(22) Filed: Oct. 14, 1997

(65) Prior Publication Data

US 2001/0013566 A1 Aug. 16, 2001

(51) Int. Cl.
*B64G 1/00* (2006.01)
(52) U.S. Cl. .................................... 244/158.4
(58) Field of Classification Search ............ 244/158 R; 342/352, 353, 356; 455/427, 429, 430, 121, 455/131, 133
See application file for complete search history.

(56) References Cited

U.S. PATENT DOCUMENTS

| | | | |
|---|---|---|---|
| 3,243,706 A * | 3/1966 | Grisham | |
| 3,340,531 A * | 9/1967 | Kefalas et al. | |
| 3,995,801 A * | 12/1976 | Bond | |
| 4,288,051 A * | 9/1981 | Goschel | |
| 4,776,540 A * | 10/1988 | Westerlund | |
| 4,809,935 A * | 3/1989 | Draim | |
| 5,158,249 A * | 10/1992 | Uphoff | |
| 5,267,167 A | 11/1993 | Glickman | |
| 5,393,017 A * | 2/1995 | Smith et al. | |
| 5,433,726 A | 7/1995 | Horstein et al. | 244/158 |
| 5,439,190 A | 8/1995 | Horstein et al. | 244/158 |
| 5,507,454 A * | 4/1996 | Dulck | |
| 5,669,585 A * | 9/1997 | Castiel et al. | |
| 5,738,309 A * | 4/1998 | Fowell | |
| 6,018,312 A * | 1/2000 | Haworth | |
| 6,091,359 A * | 7/2000 | Geier | |
| 6,104,911 A * | 8/2000 | Diekelman | |

OTHER PUBLICATIONS

US 5,415,368, 05/1995, Horstein et al. (withdrawn)

* cited by examiner

*Primary Examiner*—Tien Dinh
(74) *Attorney, Agent, or Firm*—Georgann S. Grunebach

(57) ABSTRACT

A method and system for maximizing satellite coverage at predetermined local times for a set of predetermined geographic location includes a processor operative to determine a period of rotation for each of the desired satellites in the satellite constellation. The processor also determines a time dependent coverage of the satellite constellation based on the period of rotation and the trajectory of each of the desired satellites. The trajectories of the desired satellites are tilted until the satellite constellation provides maximum coverage at the predetermined local times for the set of predetermined geographic locations. If a new satellite constellation is being designed, command signals are programmed into a computer of a launch vehicle containing the modified trajectory. If an existing satellite constellation is being modified, the ground station transmits command signals to the satellites for modifying the trajectory of the satellites in accordance with the tilted trajectory.

21 Claims, 5 Drawing Sheets

(PROPOSED REVISED)

METHOD AND SYSTEM FOR MAXIMIZING SATELLITE CONSTELLATION COVERAGE

TECHNICAL FIELD

This invention relates to methods and systems for maximizing satellite constellation coverage at predetermined local times for a set of predetermined geographic locations.

BACKGROUND ART

Space mission design and analysis is typically performed to determine constellations that can meet the greatest number of mission requirements at the least possible cost. During this process, coverage of candidate constellations is often matched to peak traffic needs at specified locations. Traffic needs, however, could be highly correlated with local time as exemplified by the daily telephone traffic which peaks during the 9:00 a.m. to 5:00 p.m. period. Synchronization of the constellation with local time, thus, can increase the resource utilization significantly.

Several existing orbits, such as Sun-synchronous orbits, Molniya orbits, etc., do synchronize the exact passing of the subsatellite point of each individual satellite over a predetermined location at certain predetermined local times. However, there is no general systematic approach to synchronize coverage of an entire satellite constellation, which may consist of more than one satellite, with local time.

DISCLOSURE OF THE INVENTION

It is thus a general object of the present invention to provide a method and system for maximizing satellite constellation coverage at predetermined local times for a set of predetermined geographic locations.

In carrying out the above object and other objects, features, and advantages of the present invention, a method is provided for maximizing satellite constellation coverage at predetermined local times for a set of predetermined geographic locations. The method includes the step of determining a satellite constellation having a first coverage wherein the constellation includes at least one desired satellite having a trajectory associated therewith. The method also includes the step of determining a period of rotation for each of the desired satellites. Still further, the method includes the step of determining a time dependent coverage of the satellite constellation based on the period of rotation and the trajectory of each of the desired satellites. The method further includes the step of tilting the trajectory of at least one of the desired satellites to obtain a second coverage based on the time dependent coverage, wherein the second coverage provides maximum coverage at the predetermined local times for the set of predetermined geographic locations. Finally, the method includes the step of generating command signals for modifying the trajectory of the at least one desired satellite.

In further carrying out the above object and other objects, features, and advantages of the present invention, a system is also provided for carrying out the steps of the above described method. The system includes a processor operative to determine a period of rotation for each of the desired satellites, determine a time dependent coverage of the satellite constellation based on the period of rotation and the trajectory of each of the desired satellites, and to tilt the trajectory of at least one of the desired satellites to obtain the second coverage. The system also includes means for generating command signals for modifying the trajectory of the at least one desired satellite.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
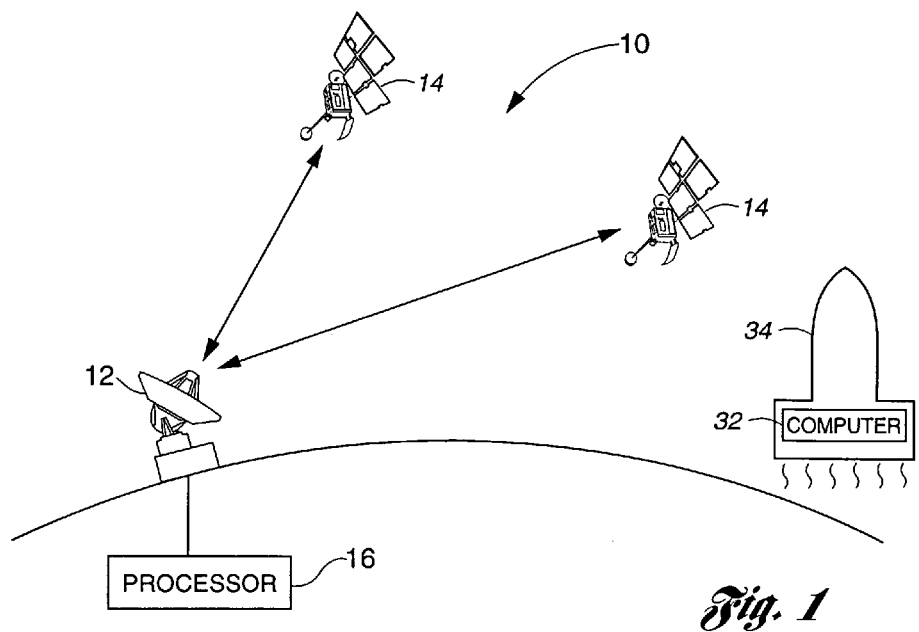
FIG. 1 is a diagrammatic representation illustrating a satellite communication system of the present invention.
Figure 2:
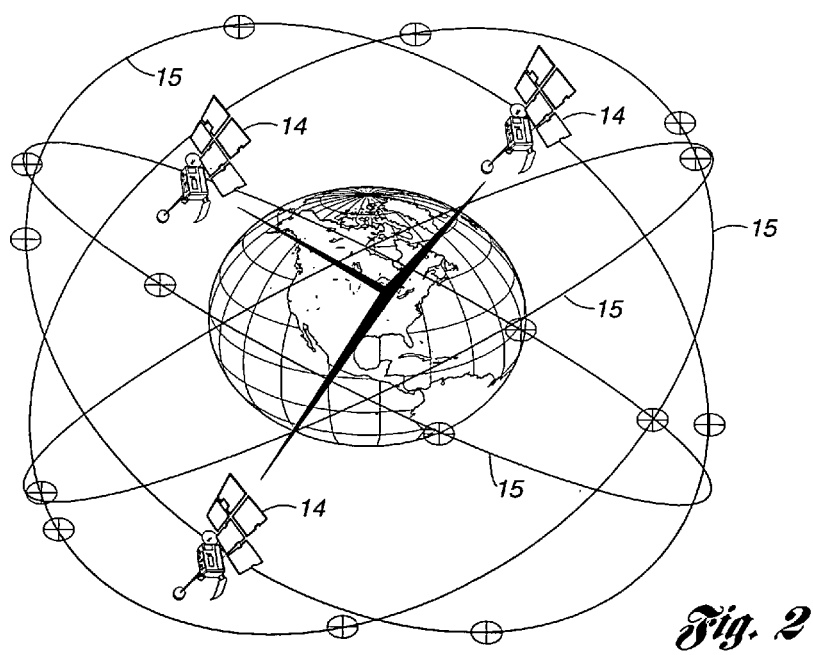
FIG. 2 is a schematic illustration of a typical constellation of satellites employed in the method and system of the present invention.

Referring first to FIG. 1, a satellite-based communications system 10 with a typical geometry for practicing the present invention is diagrammatically illustrated. In general, the system 10 includes a plurality of communications satellites 14 belonging to a satellite constellation. The satellite constellation may consist of any number of orbital planes 15, as shown in FIG. 2. The satellite constellation of the present invention may provide telecommunications coverage, or other types of coverage such as, but not limited to, remote sensing or surveillance.

The satellites 14 are in communication with a satellite ground station 12, which controls and monitors the satellites 14 according to data processed by a processor 16.

Figure 3:
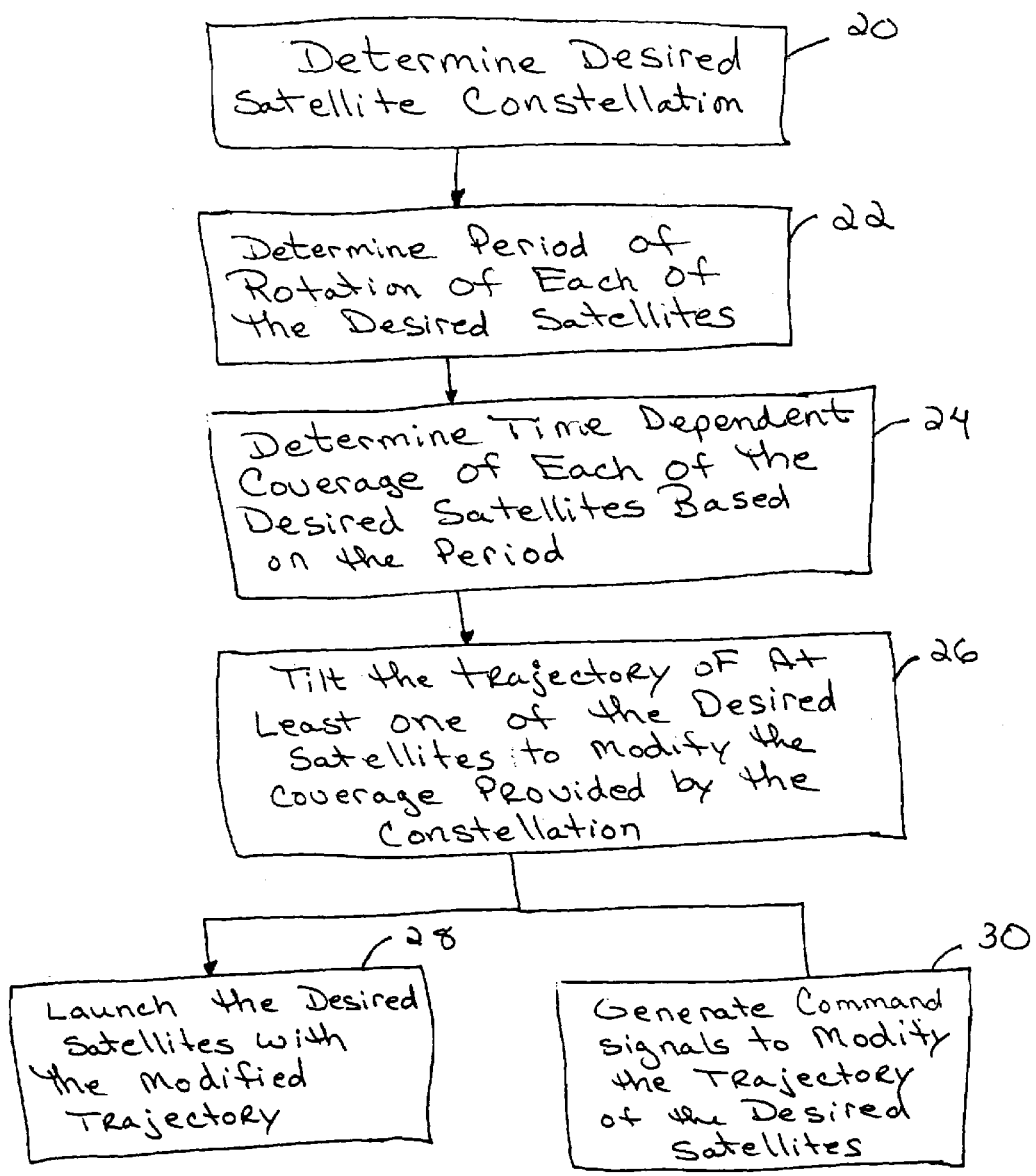
FIG. 3 is a flow diagram illustrating the general sequence of steps associated with the method of the present invention.
Figure 8:
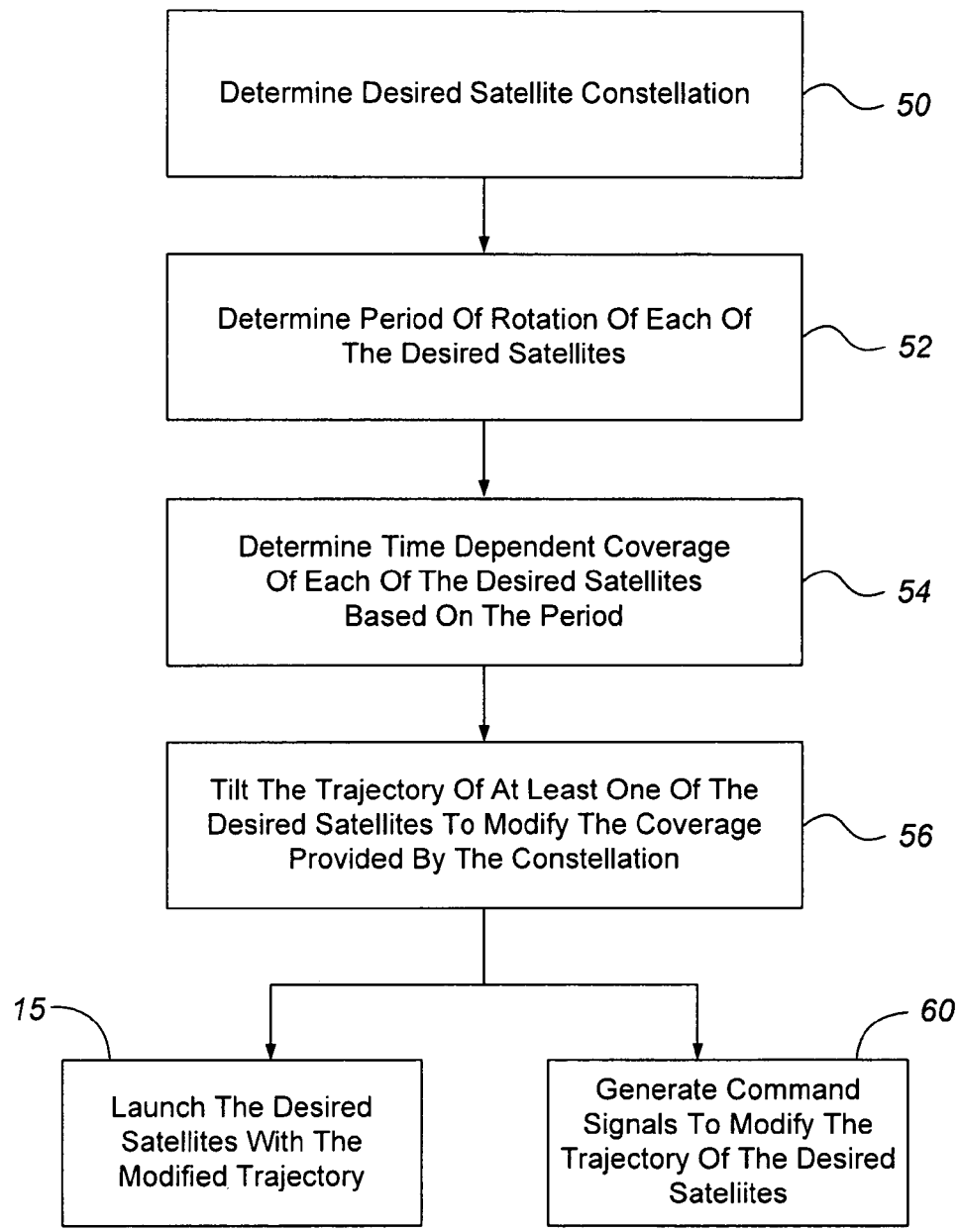
FIG. 8 is a flow diagram illustrating a second sequence of steps associated with a method of the disclosure.

Turning now to FIGS. 3 and 8, the general steps associated with the method of the present invention are illustrated. First, a desired satellite constellation is determined, as shown at block 20 (block 50 in FIG. 8). For example, it may be desirable to design a satellite constellation providing global coverage at all times. Thus, it may be desirable to use five satellites in two planes to provide such global coverage. It is also desirable to have the two planes be more uniformly spaced over the globe. If the desired geographic location is the border of Spain and France, the latitude is 40° N while the longitude equals 0°. The inclination angle of each of the satellites may be 45°. If the desired geographic location is Los Angeles, which is near longitude equal to 120°, the ascending nodes would be 60° and 120° correspondingly.

Each of these satellites are designed to follow a specific trajectory defining the orbit of the satellite as a function of time. The trajectory of a satellite orbit is defined by a set of orbital parameters. These parameters correspond to rotations of the trajectory in some inertial coordinate systems.

Next, the period of rotation of each of the satellites is determined, as shown at block 22 (block 52 of FIG. 8). If the point of interest (predetermined geographic location) and the orbit are near the equator, i.e., latitude equals 0°, the orbital period is determined as follows:

$$P=[m_s D_s D_N/(nD_N+m_s D_s)],\qquad \text{(Eq. \#1)}$$

where,

P is the orbit period with its sign indicating whether it is a direct or retrograde orbit;

n is an integer with its absolute value equal to the number of times that the satellite transverses the same geographic longitude within the repeating period;

$m_s$ is the number of mean solar day per repeating period and must be a positive integer relatively prime to n;

$D_s$ is the mean solar day, which is 24 hours or 1440 minutes; and $D_N$ is the nodal day which is the period of the earth-rotation relative to the ascending node or any point of the orbit plane. If the orbit plane does not rotate in the inertial frame, it is the same as the sidereal day $D_1$ which is about 1436 minutes.

When the point of interest cannot be covered by equatorial orbits, inclined orbits are utilized. The orbital period must then satisfy the following constraint:

$$T=m_s D_s=m_N D_N=|(n+m_N)P|\qquad \text{(Eq. \#2)}$$

where, $m_N$ is the number of nodal day per repeating period which must be a positive integer relatively prime to n; and T is the repeating period that the coverage pattern starts to repeat itself.

Utilizing the example given above, since the desired geographic location is at a latitude equal to 40° North, Equation 2 must be used to solve for the period of rotation of each of the satellites since it is not an equatorial orbit. Assuming that the difference between $m_s$ and $m_N$ can be compensated via station keeping, n is set equal to 3 and $m_N=m_s=1$. Choosing a repeating period of T equal to 24 hours, P equals 6 hours. Thus, the period of rotation of each of the desired satellites is equal to 6 hours.

The geographic longitudinal displacement for both schemes at the end of the i-th solar day is as follows:

$$2\pi \text{Mod}[(i/m_s)n,1].\qquad \text{(Eq. \#3)}$$

The geographic longitudinal displacement corresponds to the longitude of the subsatellite point minus the original longitude after the elapsed time period. Thus it is guaranteed that the satellite will return to the desired longitude at a desired local time.

Figure 4:
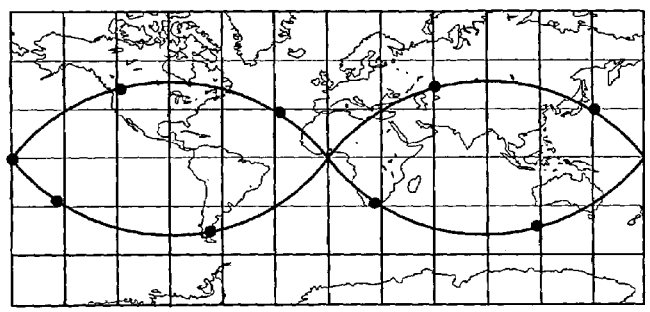
FIG. 4 is an equirectangular view of the projection of the orbit planes on the surface of the earth for a specific satellite constellation.
Figure 5:
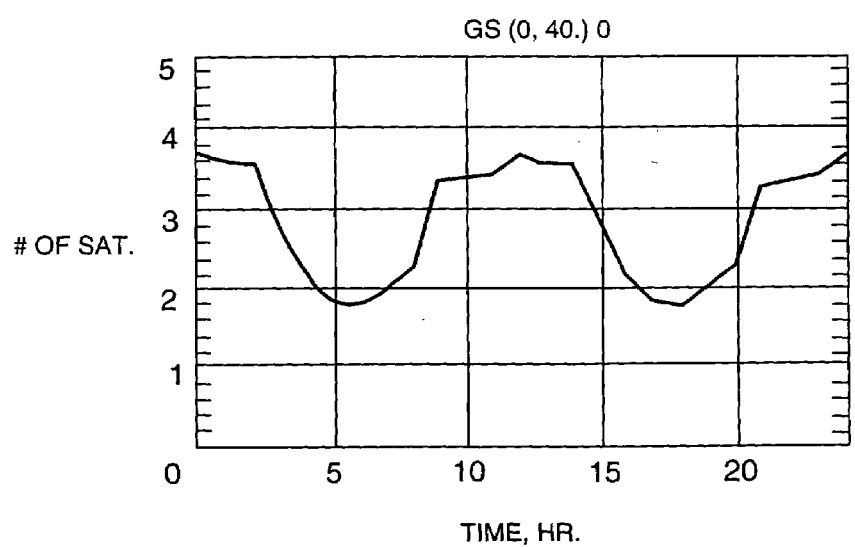
FIG. 5 is a graph illustrating the number of satellites observed per hour at a predetermined geographic location before incorporating the method of the present invention.

Knowing the period of the satellite constellation, the time dependent coverage provided by the satellites can then be determined, as shown at block 24 (block 54 of FIG. 8), utilizing simulation or other similar analysis. Referring again to the exemplary satellite constellation, which corresponds to the standard ICO (Intermediate Circular Orbit) constellation, the constellation consists of two planes of five satellites each at about 10,355 km altitude and 45° inclination. As discussed above, the ascending nodes of the two planes are 180° apart at approximately 0° and 180° longitude. The projection of the orbit planes on the surface of the earth is shown in equirectangular view in FIG. 4. Based on the period of the ICO constellation, the number of satellites observed per hour at the predetermined geographic location, e.g., 40° latitude, is shown in FIG. 5. As can be seen in FIG. 5, the satellite resources are not optimized since a maximum number of satellites is seen sporadically throughout the day.

Figure 6:
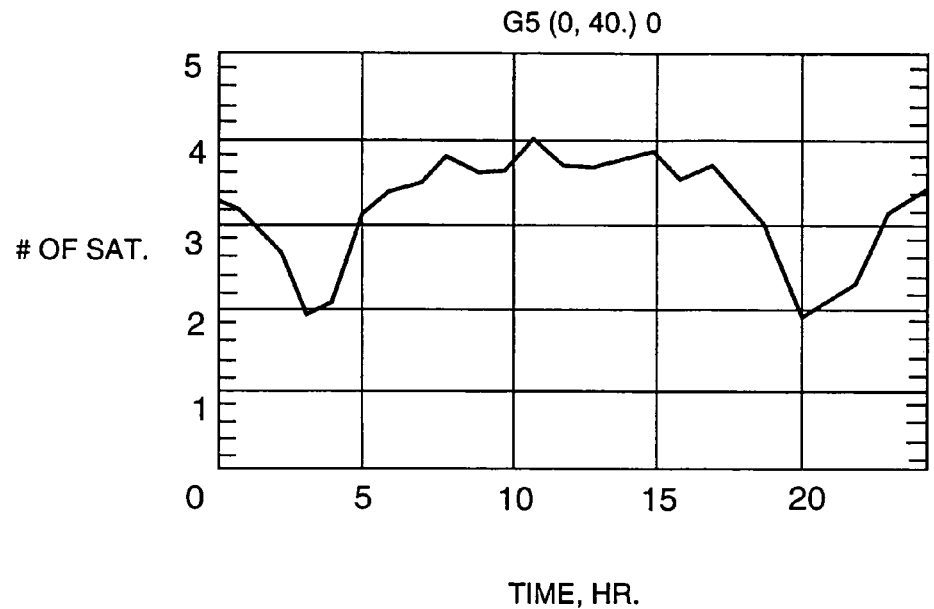
FIG. 6 is a graph illustrating the number of satellites observed per hour at the predetermined geographic location after incorporating the method of the present invention.

Since the desired coverage depends on the local time at the predetermined geographic location, it is desirable to have the maximum possible number of satellites providing coverage at the predetermined geographic location for about 8–12 hours per day during the middle of the day. This is achieved by tilting, or reorienting, the satellite constellation around the y axis in the equatorial plane, as shown at block 26 (block 56 of FIG. 8). This process is accomplished by repeating the above simulation after rotating the parameters defining the trajectory until the desired coverage is obtained. The amount of tilting depends on the constellation. For the example given, a tilting of 60° is optimal, as shown in FIG. 6. The orbital parameters of the tilted constellation corresponds to an inclination angle of 69.3° and ascending nodes of 40.9° E and 139.1° E.

Figure 7:
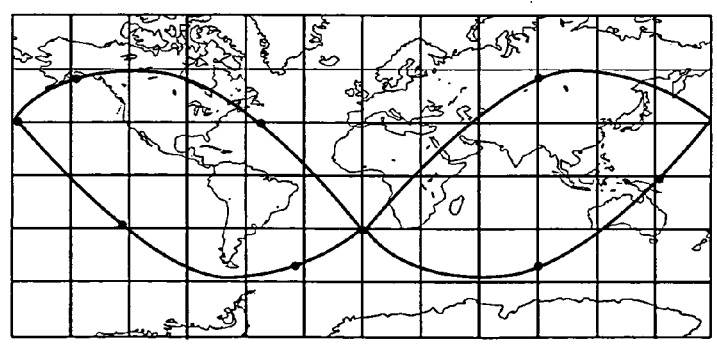
FIG. 7 is an equirectangular view of the projection of the orbit planes on the surface of the earth for the specific satellite constellation after incorporating the method of the present invention.

FIGS. 5 and 6 indicate that the constellation before tilting has about 5 hours of optimal coverage, namely from 9:00 a.m. to 2:00 p.m. Once the constellation is tilted, optimal coverage can be achieved from 5:00 a.m. to 6:00 p.m., or 13 hours, which is 260% better. The projection of the orbit planes in equirectangular view after tilting is shown in FIG. 7.

Finally, command signals are generated for modifying the trajectory based on the desired amount of tilting. Since the present invention can be utilized in both designing a new satellite constellation or modifying a pre-existing satellite constellation, this step is accomplished in one of two ways. In the case in which a new satellite constellation is being designed, the tilting operation corresponds to a rotation of the original inertial coordinate system. That is, the orbital parameters defining the trajectory is first expressed in rotation matrices. These rotation matrices are then transformed by the desired amount of tilting. A new coordinate system is then extracted from the tilted rotation matrices to obtain the new orbital parameters. The new satellite constellation with the optimum coverage is then realized by programming a computer 32 (FIG. 1) in a launch vehicle 34, such as, for example, a rocket or booster, with the new orbital parameters. The satellites are then launched into space via the launch vehicle with the new orbital parameters programmed therein, as shown at block 28 (block 58 of FIG. 8).

For existing satellite constellations, command signals must be generated by the satellite ground station 12 in order to achieve the desired amount of tilting, as shown at block 30 (block 60 of FIG. 8). The command signals are transmitted by the satellite ground station 12 to selected satellites 14 to modify the orbital parameters so that the net change of the orbital plane is 60°. The command signals instruct the satellites 14 to fire-up certain thrusters (not shown) for a certain duration at a predetermined time.

The tilting process of the present invention shifts satellite resources away from the equator towards the "hot spots" at certain times. Then the motion of the earth relative to the orbit plane, not necessarily the motion of the earth relative to the individual satellite, brings the satellite resources to the daily traffic at proper times. Thus, the daily coverage provided by the entire satellite constellation matches the traffic needs at predetermined local times. The overall performance of the satellite constellation is thus improved without any alteration to the space segment hardware.

While the best modes for carrying out the invention have been described in detail, those familiar with the art to which this invention relates will recognize various alternative designs and embodiments for practicing the invention as defined by the following claims.

What is claimed is:

1. A method for maximizing satellite constellation coverage at predetermined local peak times for a set of predetermined geographic locations, the method comprising:
   determining a satellite constellation having a first coverage, the constellation including at least two desired satellites, wherein each of the desired satellites has a trajectory associated therewith and a relative orbit within the satellite configuration;
   determining a period of orbit for each of the desired satellites;
   determining a time dependent coverage of the satellite constellation based on the orbit period and the trajectory of each of the desired satellites;
   determining a second coverage based on the time dependent coverage, which provides maximum coverage by the satellite constellation at the predetermined local peak times for the set of predetermined geographic locations;
   determining a tilted trajectory for each of the desired satellites to reorient the satellite constellation without changing the relative orbit of the at least two desired satellites with respect to each other within the satellite constellation so as to obtain the second coverage; and
   generating command signals for modifying the trajectory of each desired satellite based on the tilted trajectory.

2. The method as recited in claim 1 wherein generating the command signals includes programming a computer with orbital parameters based on the tilted trajectory.

3. The method as recited in claim 2 further comprising launching each desired satellite with the orbital parameters programmed therein.

4. The method as recited in claim 1 wherein generating the command signals includes transmitting the command signals to each desired satellite.

5. The method as recited in claim 1 wherein determining the orbit period includes determining if the trajectory of each desired satellite is equatorial.

6. The method as recited in claim 5 wherein determining the orbit period includes determining the orbit period according to the following if the trajectory is equatorial:

$$P=[m_S D_S D_N/(nD_N+m_S D_s)],$$

where,
   P is the orbit period with its sign indicating whether it is a direct or retrograde orbit:
   n is an integer with its absolute value equal to the number of times that the satellite transverses the same geographic longitude within the repeating period;
   $m_s$ is the number of mean solar day per repeating period and must be a positive integer relatively prime to n;
   $D_s$ is the mean solar day, which is 24 hours or 1440 minutes; and
   $D_N$ is the nodal day which is the period of the earth-rotation relative to the ascending node or any point of the orbit plane.

7. The method as recited in claim 5 wherein determining the orbit period includes determining the orbit period according to the following if the trajectory is not equatorial:
where, $$P = \frac{T}{n + m_N}$$

$m_N$ is the number of nodal day per repeating period which must be a positive integer relatively prime to n; and T is the repeating period that the coverage pattern starts to repeat itself.

8. The method as recited in claim 1 wherein determining the time dependent coverage includes performing a simulation.

9. The method as recited in claim 1 wherein the trajectory is defined by a first coordinate system and wherein determining the tilted trajectory comprises:
   translating the first coordinate system into rotation matrices;
   transforming the rotation matrices based on the tilting; and
   determining a second coordinate system based on the transformed rotation matrices.

10. A system for maximizing satellite constellation coverage at predetermined local peak times for a set of predetermined geographical locations, the satellite constellation having a first coverage and including at least two desired satellites wherein each of the desired satellites have a trajectory associated therewith and a relative orbit within the satellite constellation, the system comprising:
   a processor operative to determine a period of orbit for each of the desired satellites to determine a time dependent coverage of the satellite constellation based on the orbit period and the trajectory of each of the desired satellites, to determine a second coverage based on the time dependent coverage which provides maximum coverage by the satellite constellation at the predetermined local peak times and the predetermined geographic locations, and to tilt the trajectory of each of the desired satellites within the satellite constellation to obtain the second coverage; and
   means for generating command signals for modifying the trajectory of each of the desired satellite based on the tilted trajectory.

11. The system as recited in claim 10 wherein the means for generating is a computer programmed to launch each desired satellite into space with the modified trajectory.

12. The system as recited in claim 11 wherein the trajectory is a theoretical trajectory.

13. The system as recited in claim 10 wherein the means for generating is a satellite ground station operative to transmit and receive signals to and from each desired satellite.

14. The system as recited in claim 13 wherein the trajectory is an actual trajectory.

15. The system as recited in claim 10 wherein the processor, to determining the orbit period, is further provided for determining if the trajectory of each desired satellite is equatorial.

16. The system as recited in claim 15 wherein the processor, in determining the orbit period, is further operative to determine the orbit period according to the following if the trajectory is equatorial:

$$P=[m_S D_N/(nD_N+m_s D_s)],$$

where,
   P is the orbit period with its sign indicating whether it is a direct or retrograde orbit;
   n is an integer with its absolute value equal to the number of times that the satellite transverses the same geographic longitude within the repeating period;
   $m_s$ the number of mean solar clay per repeating period and must be a positive integer relatively prime to n;
   $D_s$ is the mean solar day, which is 24 hours or 1440 minutes; and $D_N$ is the nodal day which is the period of the earth-rotation relative to the ascending node or any point of the orbit plane.

17. The system us recited in claim 15 wherein the processor, in determining the orbit period, is further operative to determine the orbit period according to the following if the trajectory is not equatorial;

where, $$P = \frac{T}{n + m_N}$$

$m_N$ is the number of nodal day per repeating period which must be a positive integer relatively prime to n; and T is the repeating period that the coverage pattern starts to repeat itself.

18. The system as recited in claim 10 wherein the processor, in determining the time dependent coverage, is further operative to perform a simulation.

19. The system as recited in claim 10 wherein the trajectory is defined by a first coordinate system and wherein the processor, in tilting the trajectory, is further operative to translate the first coordinate system into rotation matrices, transform the rotation matrices based on the tilting, and determine a second coordinate system based on the transformed rotation matrices.

20. A method for providing varying satellite constellation coverage at a plurality of geographic locations while maximizing the resources of the satellite constellation at all times, comprising:

providing a satellite constellation including a plurality of satellites each having a trajectory associated therewith and a relative orbit with said satellite constellation, said satellite constellation having a first coverage area;

selecting a first geographic location having a predetermined local peak time;

tilting each of said plurality of satellites to reorient said satellite constellation without changing the relative orbit of said plurality of satellites with respect to each other within said satellite constellation in order to obtain a second coverage area, which maximizes coverage at said first geographic location during said predetermined local peak time.

21. The method of claim 20, further comprising:

selecting a second geographic location having a second predetermined local peak time that is different from said first geographic location predetermined local peak time; and tilting each of said plurality of satellites to reorient said satellite constellation without changing the relative orbit of said plurality of satellites with respect to each other within said satellite constellation in order to obtain a third coverage area, which maximizes coverage at said second geographic locating during said second predetermined local peak time.

* * * * *